United States Patent [19]

Grow et al.

[11] Patent Number: 5,051,986
[45] Date of Patent: Sep. 24, 1991

[54] ASYNCHRONOUS PRIORITY SELECT LOGIC

[75] Inventors: Robert M. Grow, San Diego, Calif.; Perry S. Stultz, Gorham, Me.

[73] Assignee: National Semiconductor Corporation, Santa Clara, Calif.

[21] Appl. No.: 444,628

[22] Filed: Dec. 1, 1989

[51] Int. Cl.⁵ ............................................. H04J 03/02
[52] U.S. Cl. .................................. 370/85.5; 370/85.6; 370/85.4; 340/825.5; 340/825.51
[58] Field of Search ..................... 340/825.5, 825.51; 370/85.5, 85.6, 85.4

[56] References Cited

U.S. PATENT DOCUMENTS

| 4,609,920 | 9/1986 | Segarra | 340/825.5 |
| 4,736,368 | 4/1988 | Szczepanek | 370/85.5 |
| 4,860,000 | 8/1989 | Kobayashi | 370/85.6 |

OTHER PUBLICATIONS

William Stallings, Handbook of Computer Communications Standards, vol. 2, Howard W. Sims & Company, 1987, pp. 177–191.

Floyd E. Ross, "FDDI≦An Overview", Digest of papers, computer Soc. Intl. Conf. Compion '87, pp. 434–444.

FDDI Media Acess Control (MAC-M), Working Draft Proposed American National Standard, X3T9, 5/88-139, Rev. 2, Jun. 1, 1989.

The Supernet TM Family for FDDI, data book, Advanced Micro Devices, pp. 4-1 through 4-51.

Primary Examiner—Benedict V. Safourek
Assistant Examiner—Dang Ton
Attorney, Agent, or Firm—Limbach, Limbach & Sutton

[57] ABSTRACT

The present invention provides asynchronous priority select logic for allowinig an individual station on a token ring network to hold a token for asynchronous transmission only for a specified maximum time period. The asynchronous priority select logic comprises a token rotation timer for timing token rotations on the ring from arrival to arrival. A token holding timer limits the amount of ring bandwidth used by the station for asynchronous transmission after the token is captured by the station. Select circuitry responsive to the value of the token rotation timer determines if the captured token is still usable for transmission by determining if the token rotation timer value is less than a preselected asynchronous threshold value. The select logic includes means for generating a selected asynchronous threshold value having a first bit length. The selected asynchronous threshold value is then expanded to a second bit length corresponding to the bit length of the token holding timer value. The expanded asynchronous threshold value and the token holding timer value are then compared and an output signal is asserted if the expanded selected asynchronous threshold value is greater than the token holding timer value.

8 Claims, 12 Drawing Sheets

ASYNCHRONOUS PRIORITY SELECT LOGIC

BACKGROUND OF THE INVENTION

1. Field of the Invention

The present invention relates generally to data transmission networks and, in particular, to asynchronous priority select logic that insures that all stations of a token ring network have equal time for transmission of data by allowing individual stations to hold the token for asynchronous transmissions only for a specified maximum time period.

2. Discussion of the Prior Art

Communications between stations in a data transmission network occurs through the transmission of a series, or "frame", of information characters, with adjacent frames being separated by explicit or implicit start-stop patterns. The use of a unique start pattern ("start delimiter") and a unique stop pattern ("end delimiter") allows the receiving station to identify the exact beginning and the exact end of each frame.

One type of network that has been enjoying increasing popularity is the token ring. A basic token ring network consists of a number of repeater nodes, each of which is connected by unidirectional transmission links to form a closed-loop ring. Information frames are transferred serially, bit by bit, around the ring from one repeater to the next, with each repeater regenerating and retransmitting each bit.

In addition to functioning as a retransmission element, each repeater on the ring also serves as a station attachment point for insertion and retrieval of information by the attached station. As an information frame circulates on the ring past a repeater, the frame's destination address field is compared to that of the attached station. If the station recognizes the destination address as its own, then it copies the entire frame.

A particular type of token ring network is defined by the Fiber Distributed Data Interface (FDDI) protocol. The FDDI protocol is an American National Standard Institute (ANS) data transmission format which applies to a 100 Mbit/sec. token ring network that utilizes an optical fiber transmission medium. The FDDI protocol is intended as a high performance interconnection between a number of computers as well as between the computers and their associated mass storage subsystems and other peripheral equipment.

As described by William Stallings, *Handbook of Computer-Communication Standards,* Volume 2, Howard W. Sims & Company, 1987, pp. 177-179, the FDDI token ring technique is based on the use of a small token frame that circulates around the ring when all stations are idle. A station wishing to transmit must wait until it detects a token passing by. It then captures the token by aborting token transmission as soon as the usable token is identified. After the token has been captured, the station is granted control of the transmission medium for up to a specified maximum time period during which it may transmit one or more information frames onto the ring.

Information is transmitted on an FDDI ring in frames that consist of a sequence of 5-bit characters or "symbols", each symbol representing 4 data bits or control code. Information is typically transmitted in symbol pairs or "bytes".

FIG. 1 shows the fields which are used within the FDDI frame and token formats. A preamble field (PA), which consists of a sequence of Idle line-state symbols, precedes every transmission. The Start Delimiter field (SD) consists of a two control symbol start delimiter pair which is uniquely recognizable independent of symbol boundaries. As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter control symbols and completes a token. The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, contains a cyclic redundancy check using the ANS standard polynomial. The INFORMATION field, as is the case for all fields covered by the Frame Check Sequence field, consists only of data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter "T" and the two control symbols "R" and "S" are uniquely encoded and distinguishable from either normal data or Idle symbols.

FIG. 2 shows the component entities necessary for a station to be in compliance with the FDDI protocol. The required components include a Station Management function (SMT) which resides in each station on the network to control the overall action of the station to ensure proper operation as a member of the ring. A Physical Layer Medium Dependent (PMD) function provides the fiber-optic links between adjacent stations on the ring. A Physical Layer Protocol function provides the encoding, decoding, (PHY) clocking and synchronization functions. A Media Access Control function (MAC) controls access to the transmission medium, transmitting frames to and receiving frames from the Media Access Control functions of other stations.

The PHY function simultaneously receives and transmits. The PHY function's transmit logic accepts symbols from the Media Access Control function, converts these symbols to 5-bit code groups and transmits the encoded serial stream, using the capabilities of the PMD, on the medium. The PHY function's receive logic receives the encoded serial stream through the PMD from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI—an Overview", Digest of Papers, Computer Soc. Intl. Conf., Compcon '87, pp. 434-444, which is hereby incorporated by reference to provide additional background information relating to the present invention.

As further described by Stallings, the FDDI protocol defines two types of transmissions: synchronous and asynchronous. A "synchronous" transmission is defined as a class of data transmission service whereby each station is allocated a minimum bandwidth and guaranteed a response time not to exceed a specific delay. An "asynchronous" transmission is defined as a class of data transmission service whereby all stations contend for a pool of dynamically allocated ring bandwidth and response time.

In setting up an FDDI network, the user defines a target token rotation time (TTRT). Each station on the ring stores the same value for TTRT. Some or all of the stations on the ring are given a synchronous allocation time ($SA_i$), which may vary among stations. The synchronous allocation must be set such that $$\Sigma SA_i + D.Max + F.Max + Token.T \leq TTRT$$

where
$SA_i$ = synchronous allocation for station i;
D.Max = propagation time for one complete circuit of the ring;
F.Max = time required to transmit a maximum length FDDI frame; and
Token.T = time required to transmit a token.

When a station receives the FDDI token, it measures the time since it last received a token, which is counted in a token rotation timer (TRT). This value is stored in a token-holding timer (THT). The token rotation timer TRT is reset to zero and begins counting again. The station can then transmit according to the following two rules. First, it may transmit synchronous frames for a time $SA_i$, as defined above. After transmitting synchronous frames, or if it has no synchronous frames to transmit, then the token-holding timer THT is enabled and begins to run from its set value. The station may transmit asynchronous data only so long as THT < TTRT.

SUMMARY OF THE INVENTION

The present invention provides asynchronous priority select logic for allowing an individual station on a token ring network to hold a token for asynchronous transmission only for a specified maximum time period. The asynchronous priority select logic comprises a token rotation timer for timing token rotations on the ring from arrival to arrival. A token holding timer limits the amount of ring bandwidth used by the station for asynchronous transmission after the token is captured by the station. Select circuitry responsive to the value of the token holding timer determines if the captured token is still usable for transmission by determining if the token rotation timer value is less than a preselected asynchronous threshold value. The select logic includes means for generating a selected asynchronous threshold value having a first bit length. The selected asynchronous threshold value is then expanded to a second bit length corresponding to the bit length of the token holding timer value. The expanded asynchronous threshold value and the token holding timer value are then compared and an output signal is asserted if the comparison indicates that an asynchronous transmission is allowed.

Other features and advantages of the present invention will be understood and appreciated by reference to the Detailed Description of the Invention provided below which should be considered in conjunction with the accompanying drawings.

DETAILED DESCRIPTION OF THE INVENTION

Figure 1:
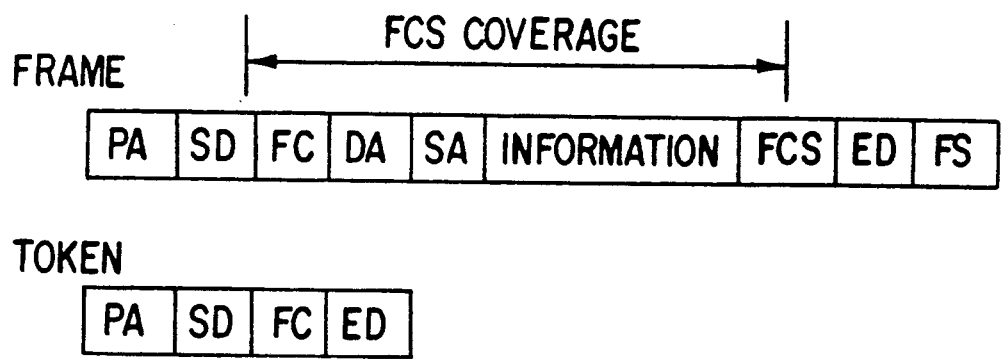
FIG. 1 illustrates the FDDI frame and token formats.
Figure 2:
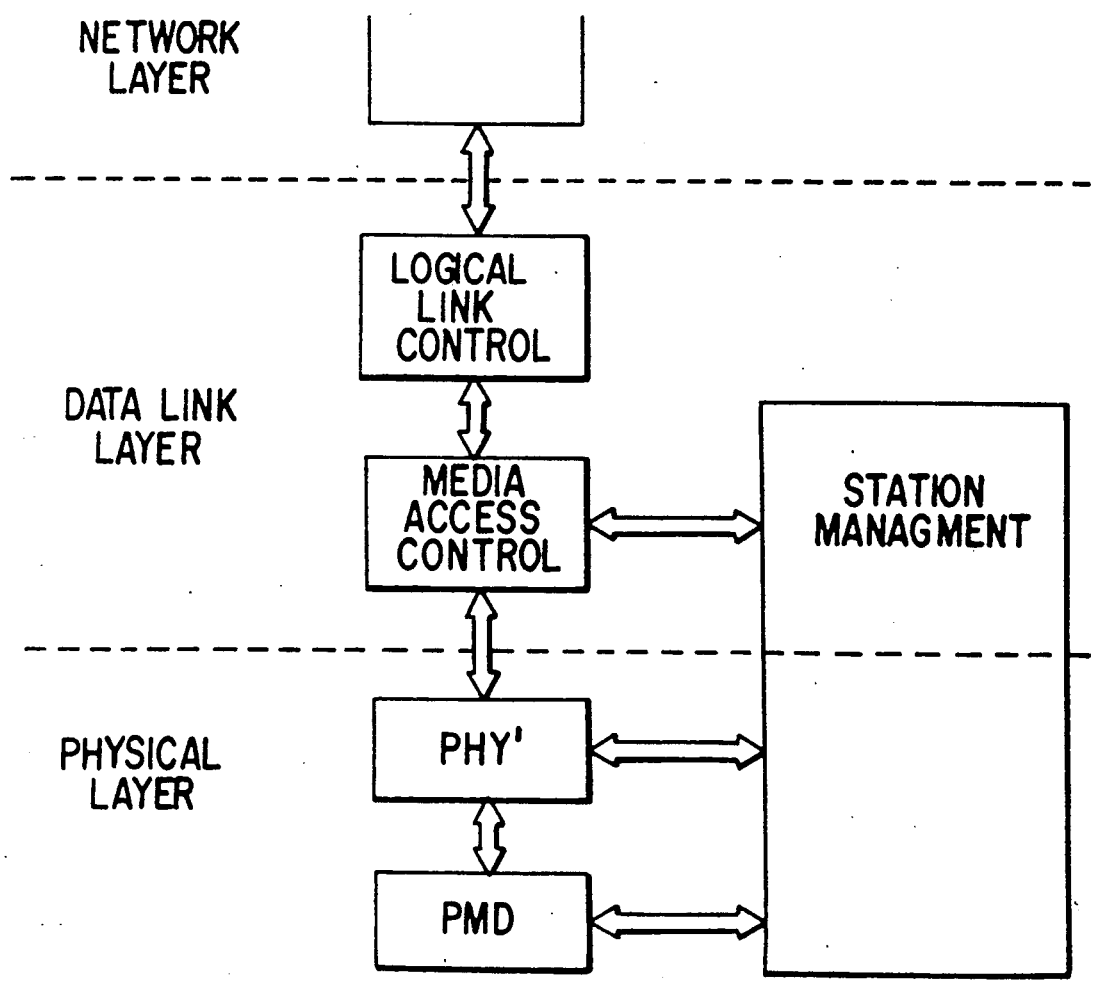
FIG. 2 is a block diagram illustrating the components required for a station in compliance with the FDDI protocol.
Figure 3:
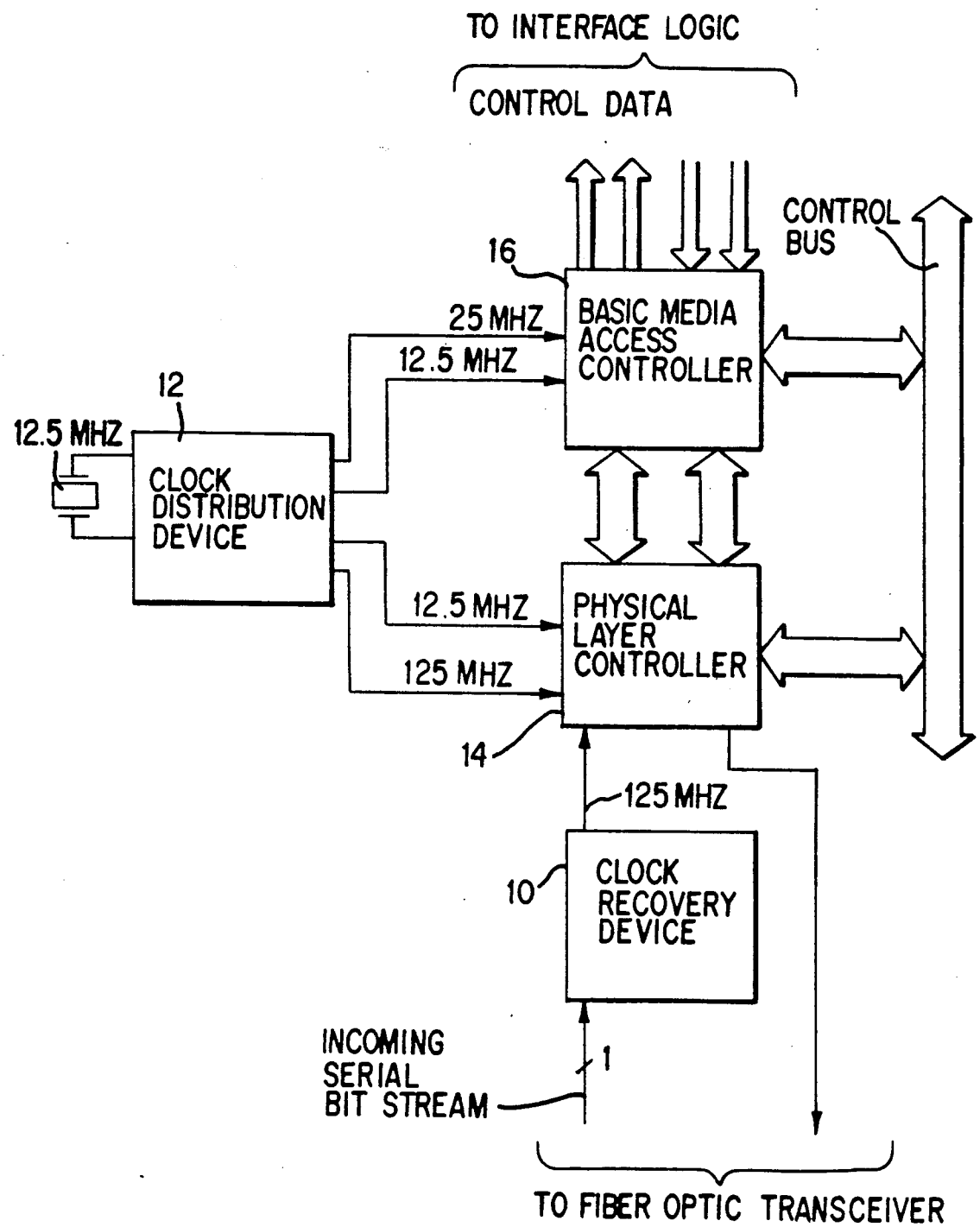
FIG. 3 is a block diagram illustrating station elements which cooperate to provide an integrated interface between a station and an FDDI token ring.

FIG. 3 shows a set of station elements which cooperate to provide an integrated interface between a station and an FDDI token ring.

A clock recovery device 10 extracts a 125 MHz clock from an incoming serial bit stream placed on the FDDI fiber optic transmission medium by the upstream station on the ring. From a 12.5 MHz crystal reference, a clock distribution device 12 synthesizes the various clocks required by a Physical Layer Controller (Player) 14 and a basic Media Access Controller (BMAC) 16. The Player 14 converts the 12.5 Mbyte/sec. stream retrieved from the BMAC 16 and decodes the incoming 4B/5B data into the internal code. The BMAC 16 controls the transmitting, receiving, repeating and stripping of FDDI tokens and frames. Among its features, and as will be described in greater detail below, the BMAC 16 implements the timed token media access control protocol defined by the American National Standard X3T9.5 FDDI MAC standard, which is hereby incorporated by reference (The ANS X3T9.5 MAC standard reference herein is ANS document X3T9.5/88-139, X3T9/, REV 2, titled "FDDI Media Access Control (MAC-M) (Maintenance Revision)", Working Draft Proposed American National Standard, June 1, 1989).

Figure 4:
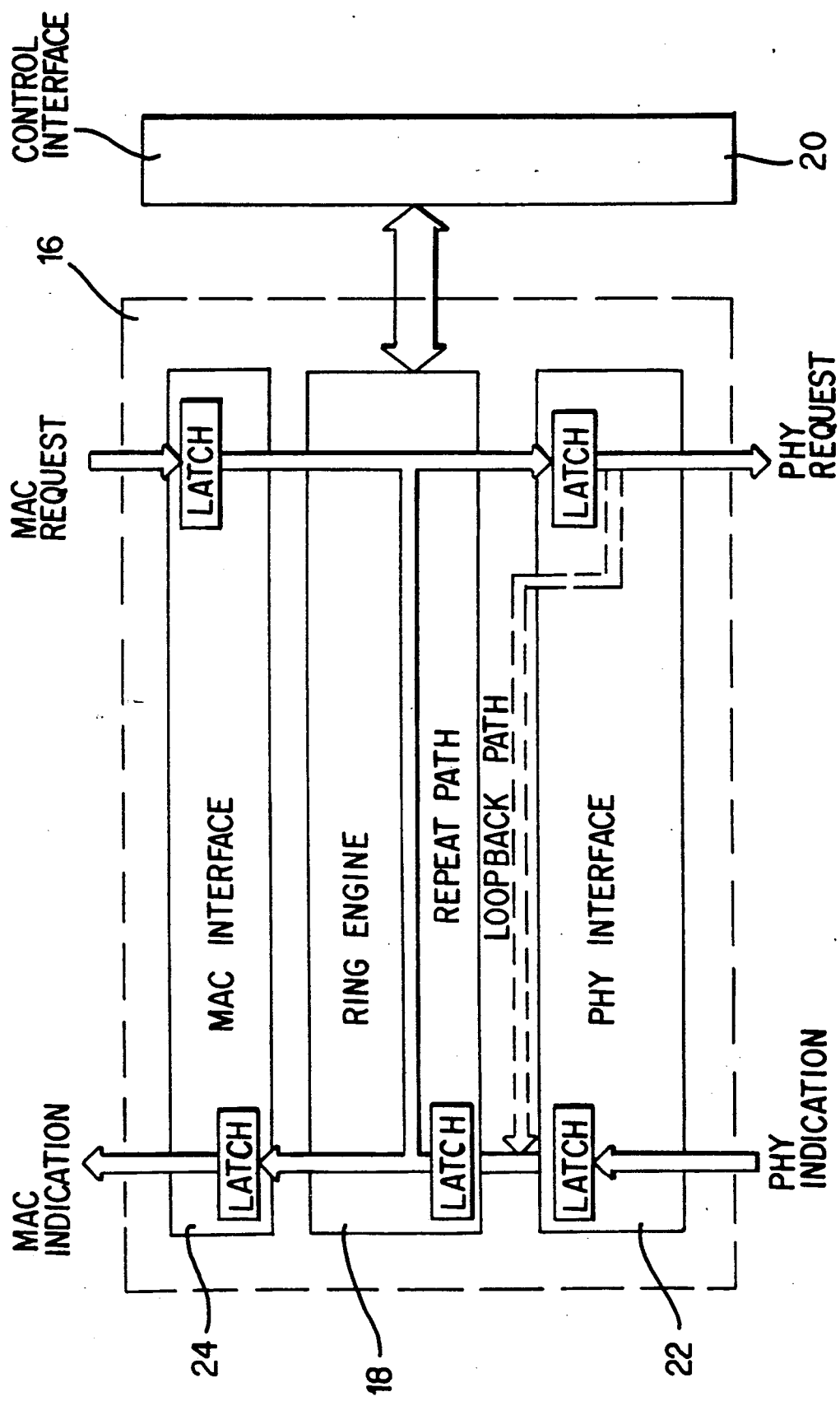
FIG. 4 is a block diagram illustrating the basic components of an embodiment of an FDDI Media Access Control controller.

As shown in FIG. 4, the BMAC 16 includes a ring engine 18, a control interface 20, a PHY interface 22 and a MAC interface 24.

As will be described in greater detail below, the ring engine 18 is the "heart" of the BMAC 16, implementing the ANS X3T9.5 MAC protocol for transmitting, receiving, repeating and stripping frames on the FDDI ring.

The control 20 implements the interface to the Control Bus (see FIG. 3) by which to initialize, monitor and diagnose the operation of the BMAC 16.

The PHY interface 22 provides a byte stream to the Player 14 via the PHY Request bus and receives a byte stream from the Physical 14 via the PHY Indication bus.

The MAC interface 24 provides the interface to the station's external buffering and control logic. A byte stream is provided to the buffering and control logic with appropriate control signals via the MAC Indication bus. A byte stream is provided to the MAC interface with appropriate handshake control signals via the MAC Request bus.

Figure 5:
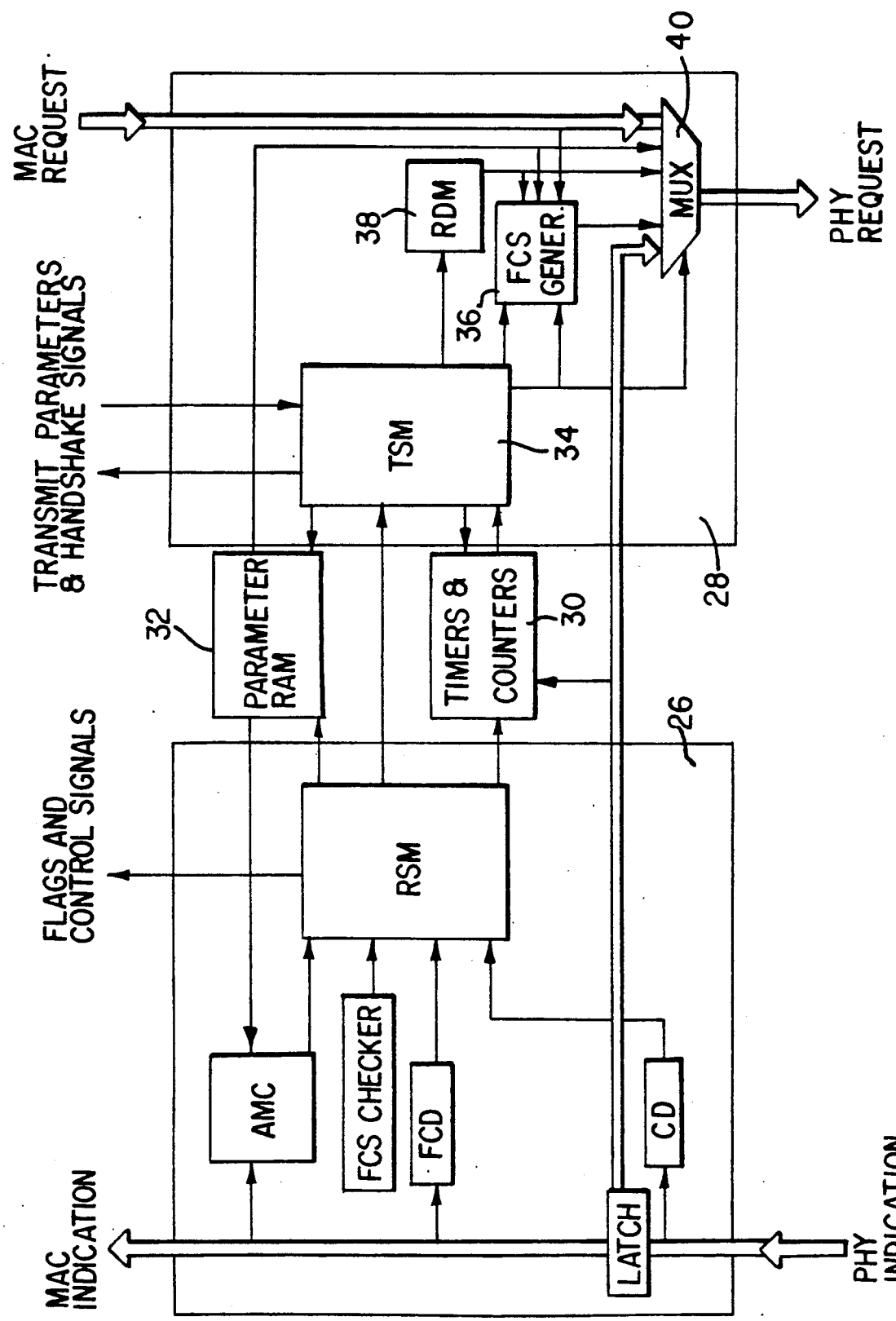
FIG. 5 is a block diagram illustrating an embodiment of a ring engine.

Referring to FIG. 5, the ring engine 18 includes two major blocks, a receiver 26 and a transmitter 28, which share timer/counter logic 30 and a MAC Parameter RAM 32.

The receiver 26 validates information from the FDDI ring, detects errors and failures, and produces appropriate signals and flags that are used by the transmitter 28 and presented to the MAC interface 24. In addition, the receiver 26 delineates frames, tokens and fragments from the byte stream received on the PHY Indication bus based upon identification of start and end delimiters.

The MAC Parameter RAM 32 is a dual-ported RAM that, as implied, contains parameters such as the address of the associated station. The receiver 26 uses the values stored in Parameter RAM 32 to compare received addresses with its addresses. The transmitter 28 also uses the parameter RAM 32 for generating the source address (SA) for all frames generated by the station.

The transmitter 28 repeats frames from other stations on the ring and inserts frames from its associated station into the ring in accordance with the FDDI timed-token MAC protocol. The transmitter 28 uses information provided by the receiver 26 to decode whether to repeat, strip or generate a frame. The transmitter 28 continues to repeat frames until a transmission request is conveyed by the associated station to the ring engine 18.

A transmission request includes the requested service class (i.e., synchronous or asynchronous) and the type of token to capture and issue. As stated above, a station gains the right to transmit by capturing the token. Once a token has been captured, the ring engine 18 waits until the data is ready to be transmitted by the station.

As a frame is transmitted, it passes along the ring, with each sequential station inspecting it a byte at a time. The frame is repeated at every station and is eventually stripped by the station that originally transmitted the frame.

As further shown in FIG. 5, the transmitter 28 includes a transmitter state machine (TSM) 34, an FCS generator 36, a ROM 38 and multiplexing logic 40 for controlling the source of data to the ring.

The transmitter state machine 34 provides sequencing through the fields of a frame that is to be transmitted to the ring.

The FCS generator 36 calculates the 32-bit CRC and appends it to the information from the data stream.

The ROM 38 is used to generate control symbol pairs that are transmitted with the frame as the End Delimiter and Frame Status fields.

The output multiplexor 40 is used to select the source of information to be placed on the PHY Request bus. This information is either repeated from the PHY Indication Bus or independently generated by the associated station. Information can be generated either from the data stream, the ROM 38, the FCS generator 36 or from the parameter RAM 32.

The timer/counter block 30 includes all of the timers required to implement the ANS X3T9.5 MAC standard as well as several event counters. It also includes the token timing logic required for implementation of the FDDI timed-token protocol.

Figure 6:
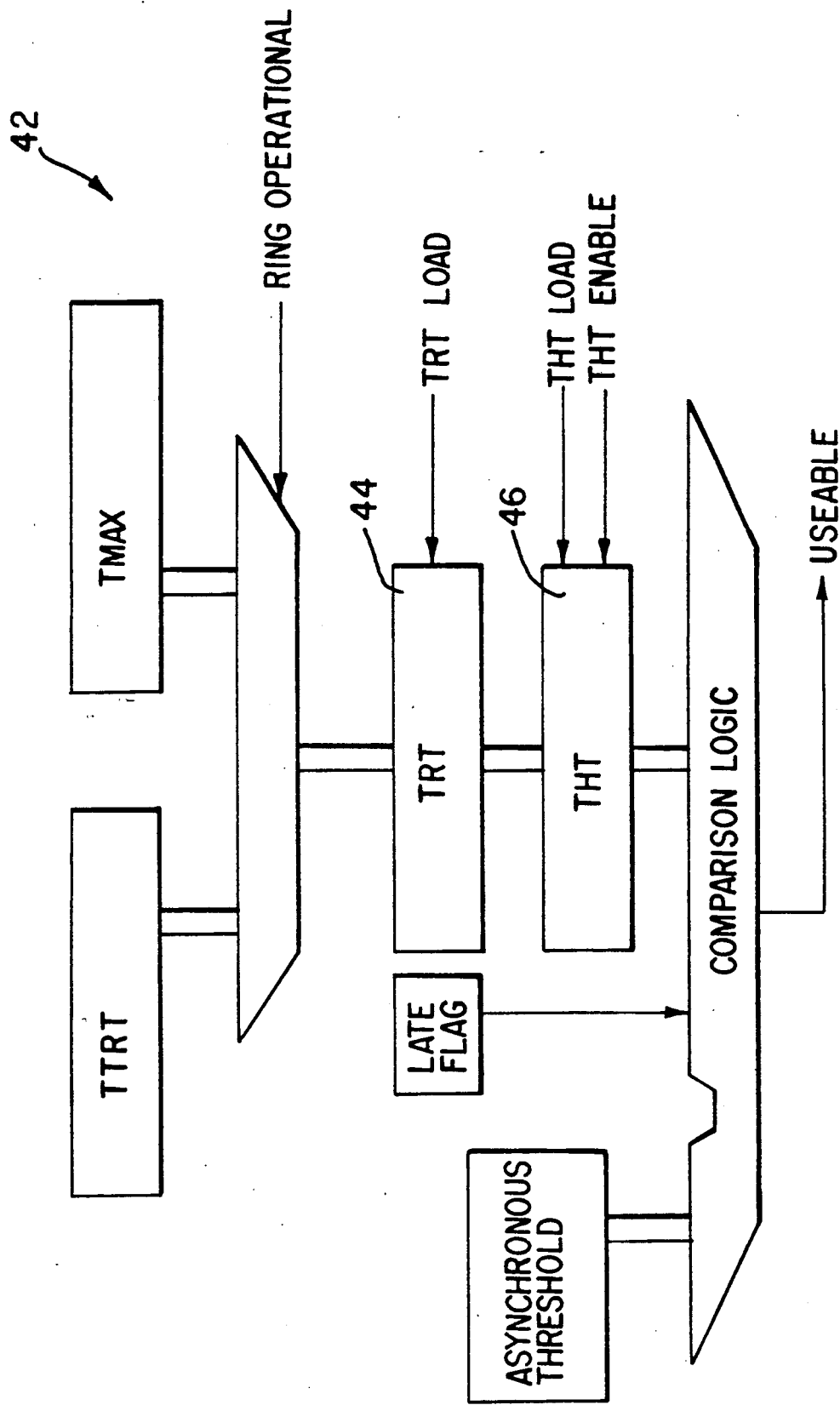
FIG. 6 is a block diagram illustrating asynchronous priority select logic in accordance with the present invention.

Referring to FIG. 6, the token timing logic 42 is controlled by the transmitter 28. The token rotation timer (TRT) 44 is used to time token rotations on the ring from arrival to arrival. The longer the rotation time, the greater the amount of load on the ring. The timers in the token timing logic shown in FIG. 6 are implemented as up-counters that increment every 80 ns. The counters are reset by loading the twos complement of the threshold. This allows a simple carry to denote timer expiration. The token holding timer (THT) 46 is used to limit the amount of ring bandwidth used by the station for asynchronous transmission after the token is captured by the station. Before each frame is transmitted, the value of THT is used (as will be described below) to determine if the captured token is still usable for transmission. A token is usable for asynchronous traffic if THT has not reached the selected threshold.

Four asynchronous thresholds are supported by the BMAC 16; three are programmable and one is fixed at the negotiated target token rotation time (TTRT). Requests to transmit frames at one of the priority thresholds are serviced when the token holding timer 46 has not reached the selected threshold. When TRT reaches zero, a Late Flag is set indicating that the token is late. While the Late Flag is set, no asynchronous frames may be transmitted, but the token is available for synchronous transmission.

On an early token arrival, that is, the token arrives and the Late Flag is not set, TRT is loaded with a negotiated target token rotation time TTRT and counts up. On a late token arrival, i.e. the token arrives and the Late Flag is set, the Late Flag is cleared and TRT continues to count. When TRT expires then the Late Flag is not set, the Late Flag is set and TRT is loaded with TTRT. Accumulated lateness is implemented precisely as defined in the ANSI X3T9.5 MAC standard.

THT follows the value of TRT until a token is captured. When the token is captured, TRT may be reloaded with TTRT, while THT continues to count from its previous value (THT does not wraparound). THT increments when enabled. The incrementing of THT is disabled during synchronous transmission, for example. THT is used to determine if the token is usable for asynchronous requests. For these purposes, the token is considered as late 1-byte before it is actually late (to promote interoperability with less careful implementations).

Asynchronous threshold comparisons are pipelined, so a threshold crossing may not be detected immediately. However, the possible error is a fraction of the precision of the threshold values.

Should TRT expire while the Late Flag is set, TRT is loaded with TMAX and the recovery process is invoked, unless the inhibit recovery required option is set. The recovery required condition becomes true one byte time after TRT expires, also to promote interoperability with less careful implementations. When TRT expires and the ring is not operational, TRT is loaded with TMAX. TRT is also loaded with TMAX on a reset.

The late count is slightly different than the late count of the FDDI standard. Late count is cleared whenever the ring becomes non-operational and on a MAC reset. Late count increments whenever the ring is non-operational, TRT expires and the Late Flag is set.

Figure 7:
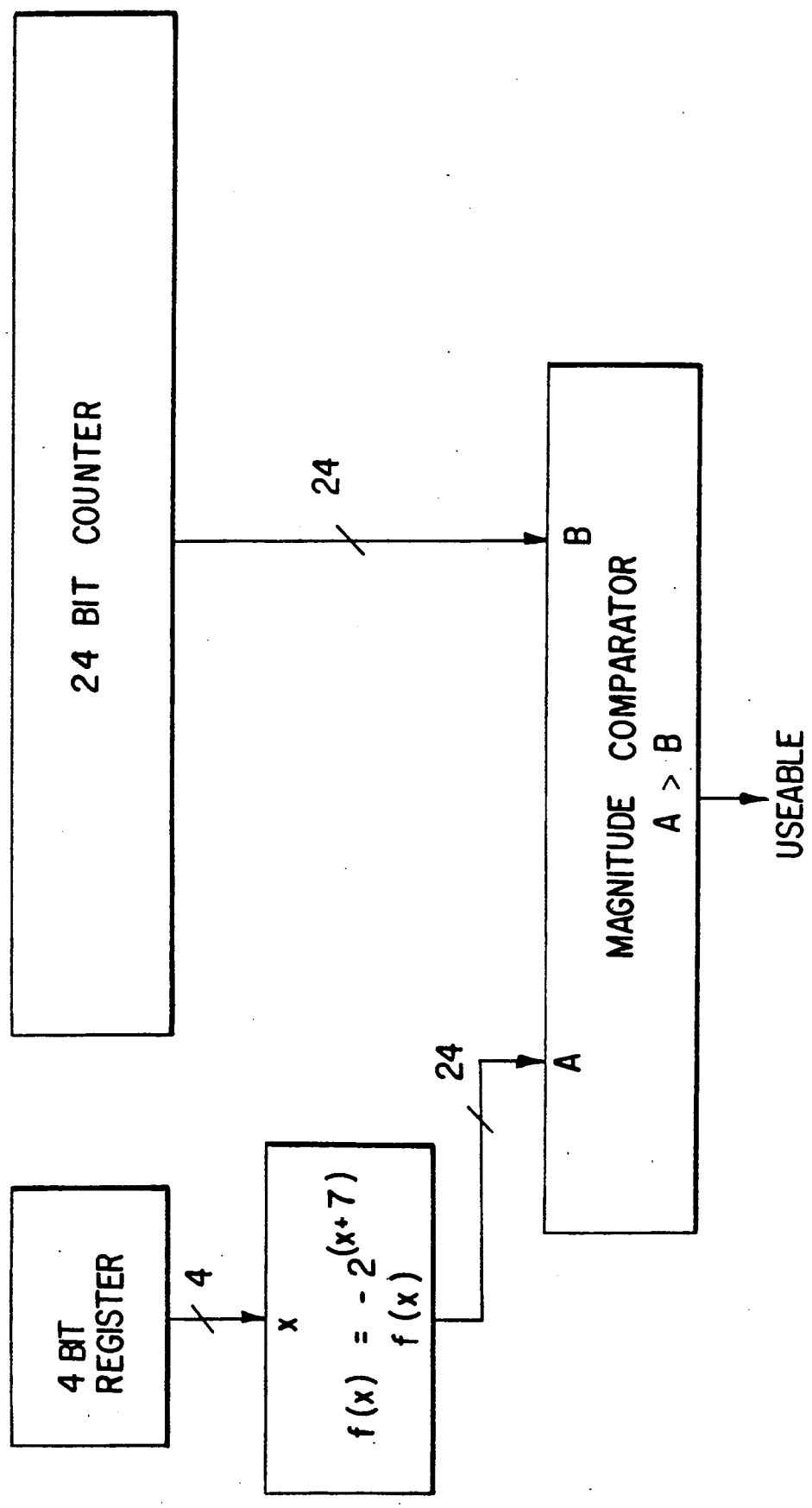
FIG. 7 is a block diagram illustrating the basic logic blocks of asynchronous priority logic in accordance with the present invention.

As shown in FIG. 7, the logic used to decide if the token is usable for a particular frame can be broken down into three basic blocks: THT, asynchronous thresholds and comparison logic. In the illustrated embodiment, the THT is a 24-bit up-counter that counts from 0 to $2^{24}-1$. Upon reaching $2^{24}-1$, the counter is loaded with a new token time value.

The asynchronous thresholds logic includes three different 4-bit storage locations which are progammed by the user and selectively presented as outputs via a multiplexor.

The comparison logic is used to determine if the threshold value stored in the selected asynchronous threshold is greater than the value stored in the THT. The comparison logic requires as an input the 24-bit output of the THT and the 4-bit output of an asynchronous threshold. The output of the comparison logic is a single bit. This single bit, i.e. useable, uses the following equation to determine its state.

If $-[2^{(7+AT)}] >$ THT, then USEABLE = 1, (1)

Else, USEABLE = 0

That is, the necessary task is to expand the 4-bit Asynchronous Threshold value (AT) to a 24-bit value utilizing the equation $-[2^{(7+AT)}]$.

This expanded value is then compared to the 24-bit output of the up-counter. If the expanded value is greater than the count value, then the USEABLE bit is held high. The USEABLE bit signals the MAC transmitter 28 (see FIG. 5) whether or not the next asynchronous request can be serviced in the time remaining.

Implementation of the expander and the comparator in a conventional manner requires a large number of gates, which consume die area, and causes timing problems with the USEABLE signal. To solve this problem, the expander and comparator are combined in an optimum manner. This is possible because the output of the expander is always 1 of 16 distinct values.

Figure 8:
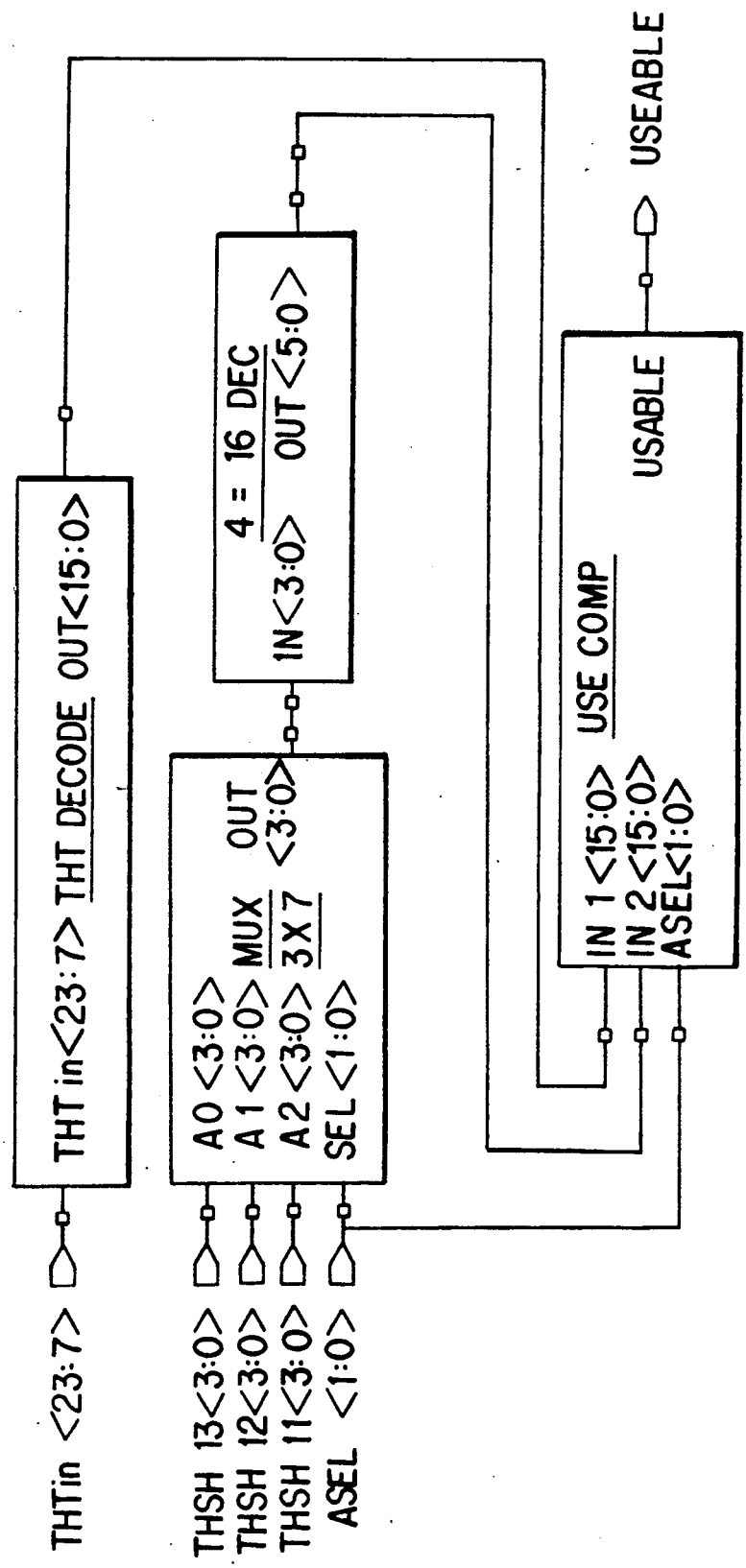
FIG. 8 is a block diagram illustrating asynchronous priority logic in accordance with the present invention.

FIG. 8 shows an implementation of the block diagram shown in FIG. 7. The illustrated asynchronous priority logic receives as input the upper 17 bits of the counter THT, which are labeled as THTin<23:7>, the three 4-bit asynchronous threshold values THSH3<3:0>, THSH2<3:0>, and THSH1<3:0>, and the control bus ASEL<1:0>. The logic produces the single bit USABLE. The input ASEL<1:0> controls the selection of one of the three threshold inputs. The flow of the block is described below.

One of the three threshold values is selected for decoding by the block MUX. The threshold selected by the MUX is then decoded by the block DEC. The decoded threshold value is then compared by USC to the output of the block THTD, which is the decoded value of the upper 17 bits of the THT counter. The logic implements equation (1) above.

Figure 9:
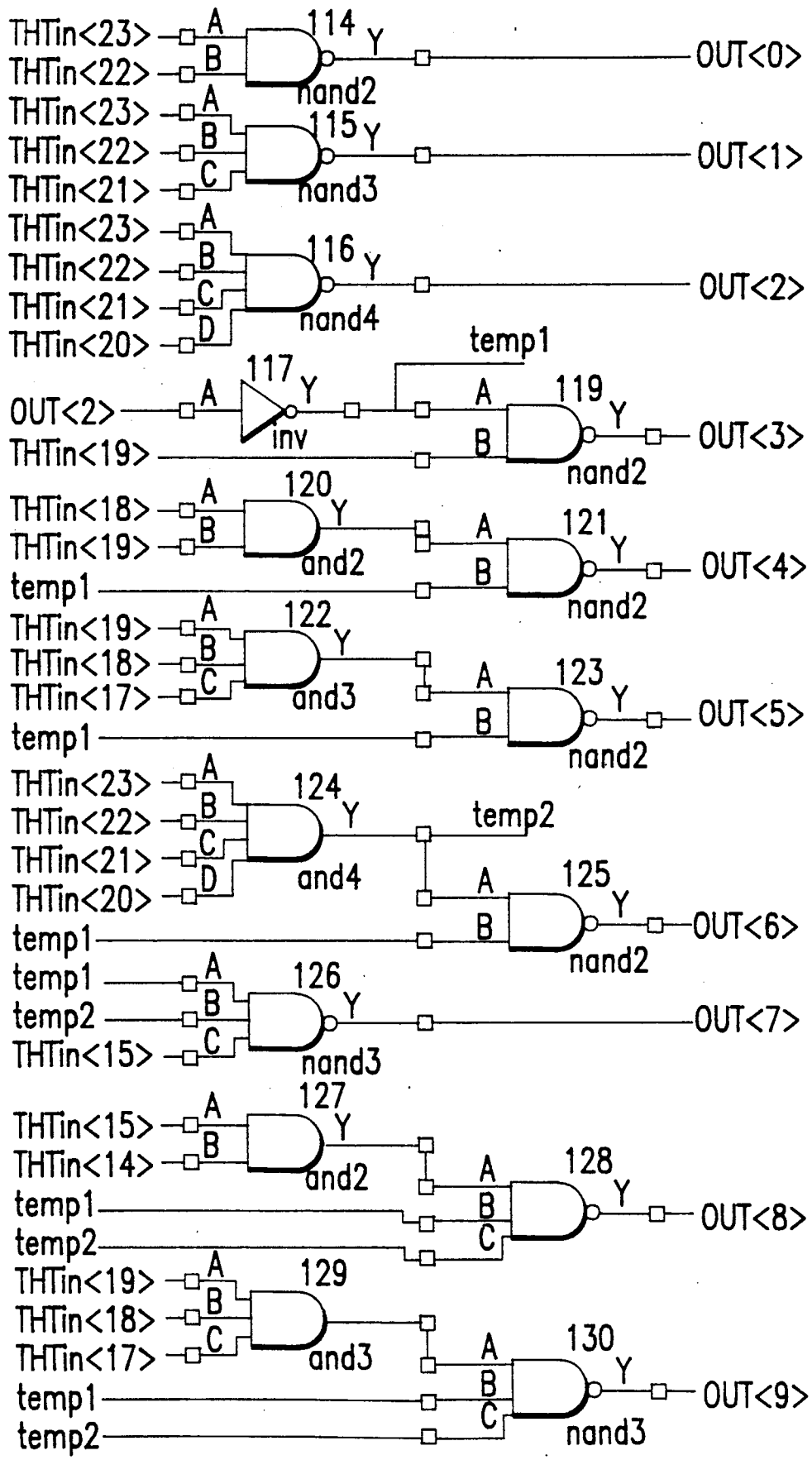
FIG. 9 is a logic diagram illustrating a gate level implementation of the THT decode (THTD) block in FIG. 8.
Figure 9:
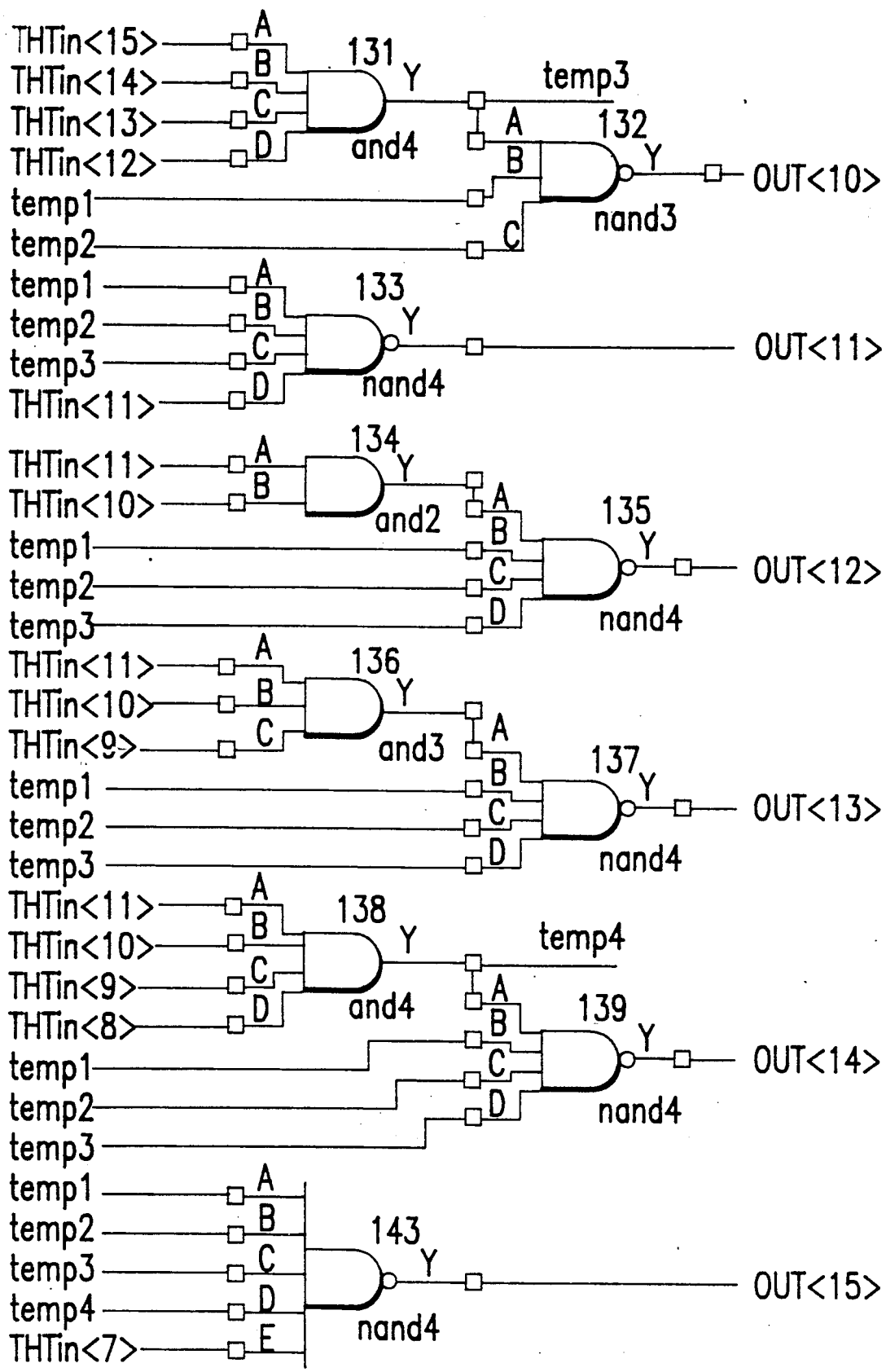

FIG. 9 is the implementation of the thtdecode block. The truth table for this logic is given below.

| Truth table for block THTDECODE. | | |
|---|---|---|
| THTin (binary) | | |
| (msb) | (lsb) | OUT (hexadecimal) |
| 0xxxxxxxxxxxxxxxxxxxxxxx | | FFFF |
| 10xxxxxxxxxxxxxxxxxxxxxx | | FFFF |
| 110xxxxxxxxxxxxxxxxxxxxx | | FFFE |
| 1110xxxxxxxxxxxxxxxxxxxx | | FFFC |
| 11110xxxxxxxxxxxxxxxxxxx | | FFF8 |
| 111110xxxxxxxxxxxxxxxxxx | | FFF0 |
| 1111110xxxxxxxxxxxxxxxxx | | FFE0 |
| 11111110xxxxxxxxxxxxxxxx | | FFC0 |
| 111111110xxxxxxxxxxxxxxx | | FF80 |
| 1111111110xxxxxxxxxxxxxx | | FF00 |
| 11111111110xxxxxxxxxxxxx | | FE00 |
| 111111111110xxxxxxxxxxxx | | FC00 |
| 1111111111110xxxxxxxxxxx | | F800 |
| 11111111111110xxxxxxxxxx | | F000 |
| 111111111111110xxxxxxxxx | | E000 |
| 1111111111111110xxxxxxxx | | C000 |
| 11111111111111110xxxxxxx | | 8000 |
| 11111111111111111xxxxxxx | | 0000 |

Figure 10:
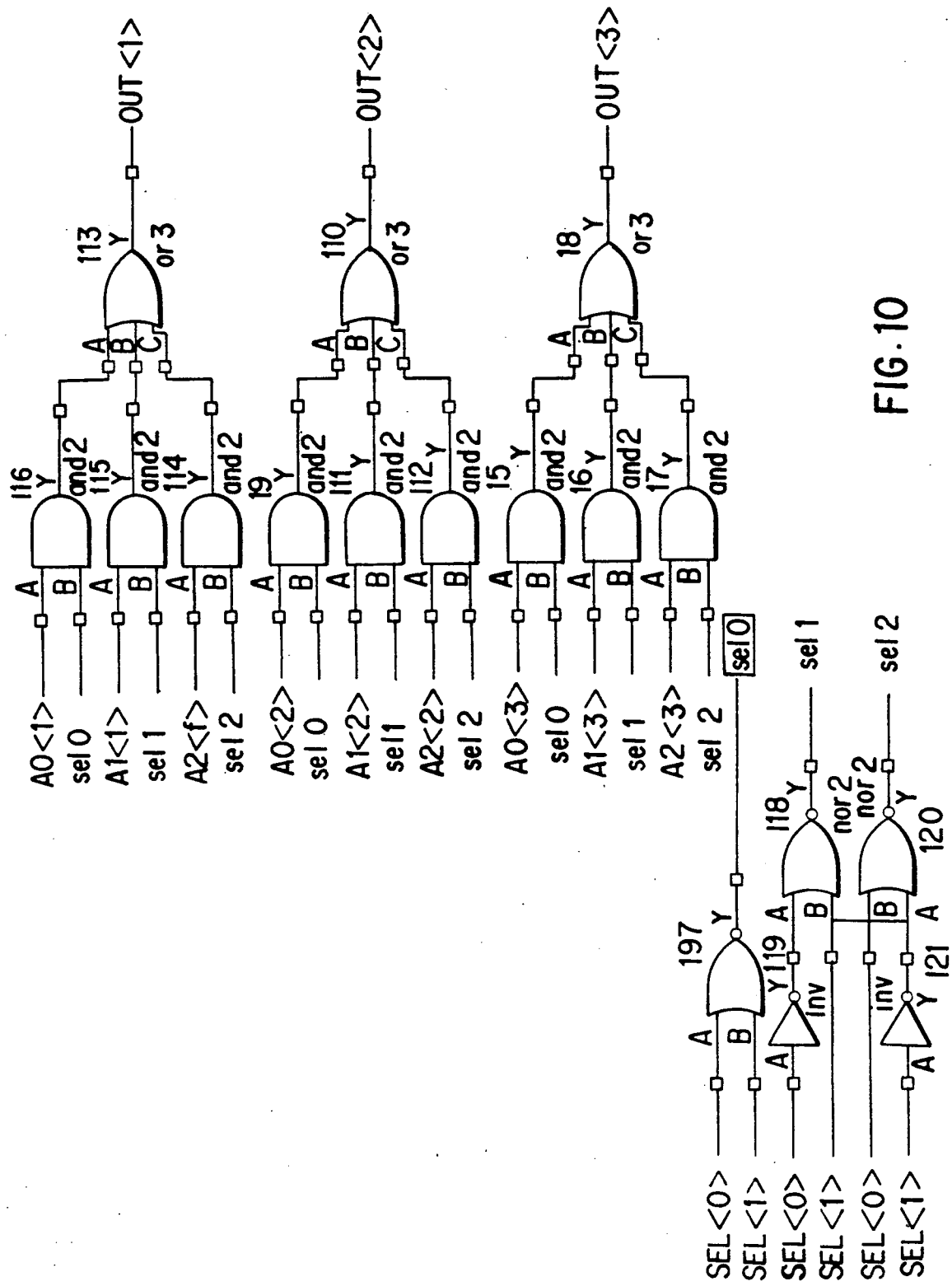
FIG. 10 is a logic diagram illustrating a gate level implementation of the 4mux3x1 (MUX) block in FIG. 8.

FIG. 10 is a conventional 4-bit wide, 3 to one multiplexor.

Figure 11:
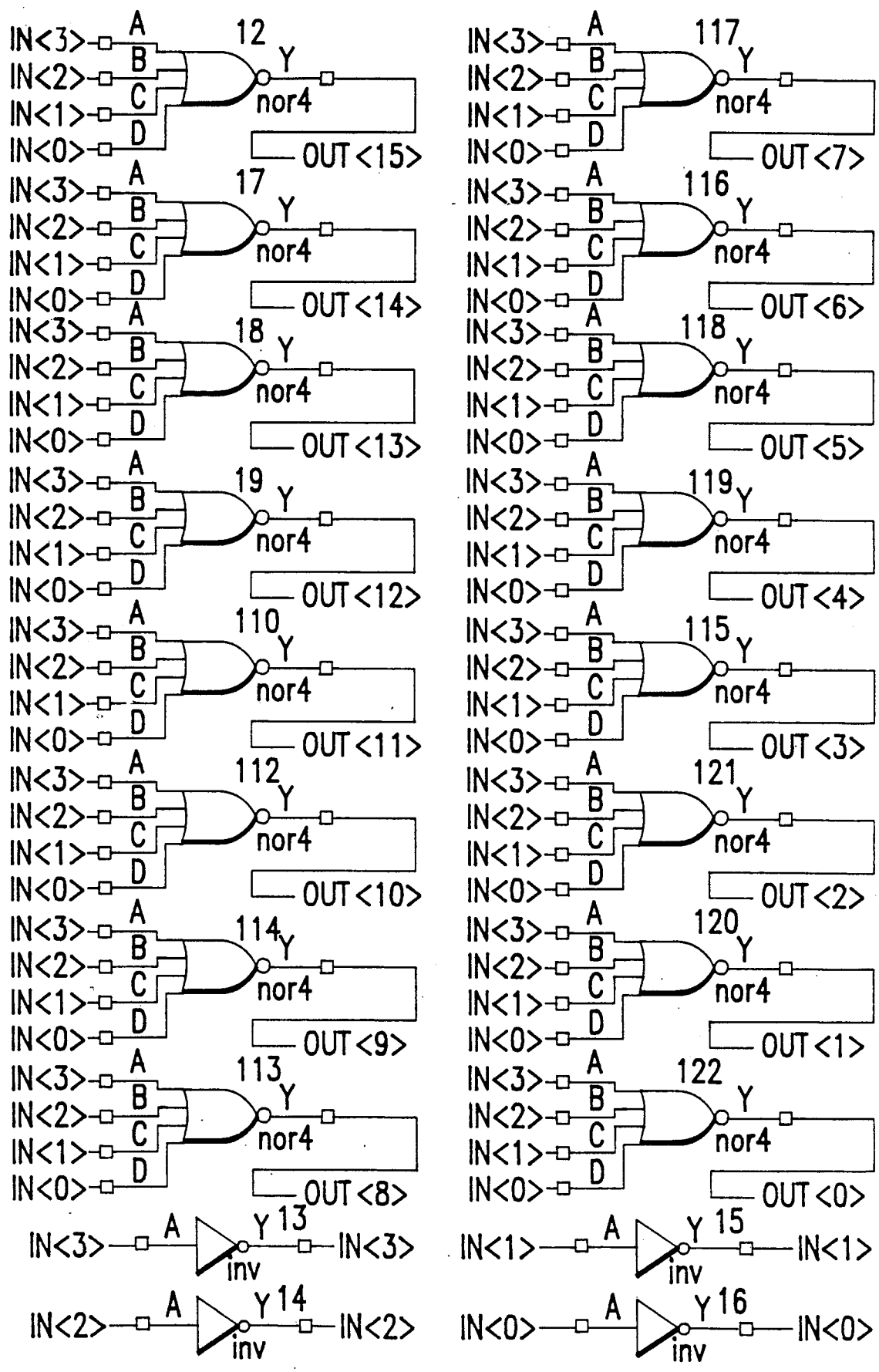
FIG. 11 is a logic diagram illustrating a gate level implementation of the 4to16dec (DEC) block in FIG. 8.

FIG. 11 is a simple active high decoder. The truth table for the decode is given below.

| Truth table for block 4TO16DEC. | |
|---|---|
| IN (hexadecimal) | OUT (hexadecimal) |
| 0 | 8000 |
| 1 | 4000 |
| 2 | 2000 |
| 3 | 1000 |
| 4 | 0800 |
| 5 | 0400 |
| 6 | 0200 |
| 7 | 0100 |
| 8 | 0080 |
| 9 | 0040 |
| A | 0020 |
| B | 0010 |
| C | 0008 |
| D | 0004 |
| E | 0002 |
| F | 0001 |

Figure 12:
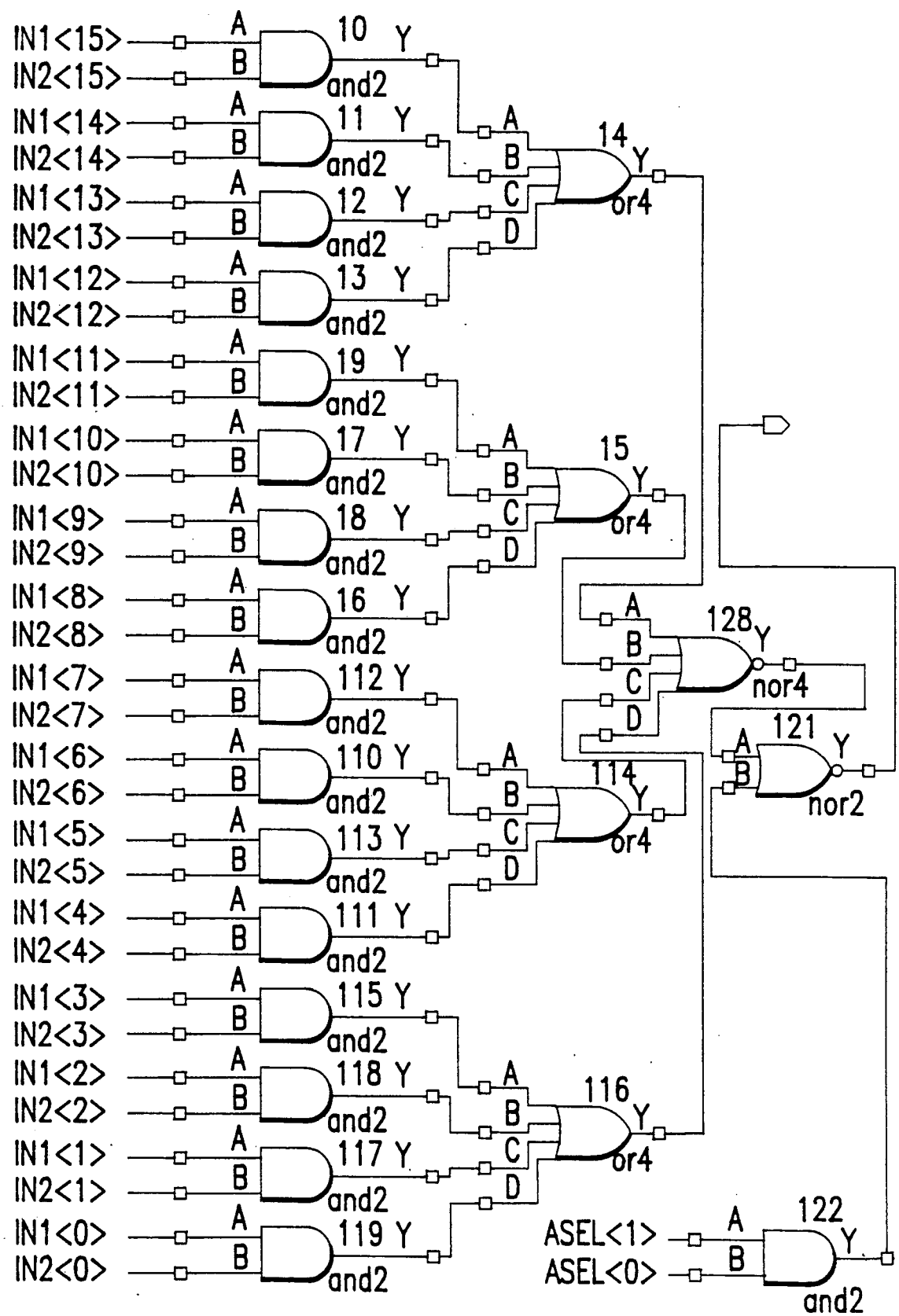
FIG. 12 is a logic diagram illustrating a gate level implementation of the usabcomp (USC) block in FIG. 8.

FIG. 12 is the quasi comparator block. A value of 8000 out of the DEC is the highest threshold possible. Since the signal USABLE_ is active hogh, the output of USC must be high until the value out of THTDEC is 8000, which implies a value of THTin greater than the selected threshold. This quasi compare is performed with a simple AND OR tree as shown in FIG. 12. The additional AND gate I22 in FIG. 12 is used to force USABLE high.

The following truth table represents the functionality of the block USC.

| | |
|---|---|
| FFFF | 1111111111111111 |
| FFFE | 1111111111111110 |
| FFFC | 1111111111111100 |
| FFF8 | 1111111111111000 |
| FFF0 | 1111111111110000 |
| FFE0 | 1111111111100000 |
| FFC0 | 1111111111000000 |

```
              FF80   1111111110000000
INI<15:0>     FF00   1111111100000000
              FE00   1111111000000000
              FC00   1111110000000000
              F800   1111100000000000
              F000   1111000000000000
              E000   1110000000000000
              C000   1100000000000000

8000   1000000000000000
              0000   0000000000000000
                     8421000000000000
                     0000842100000000
                     0000000084210000
                     0000000000008421
                     INI<15:0>
```

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. In a station which is one of a plurality of stations interconnected by a communications medium in a token ring communications system configuration wherein the station gains the right to transmit on the communications medium by capturing a token, asynchronous priority select logic for allocating the token to the station for asynchronous transmission for a specified time period, the asynchronous priority select logic comprising:
   (a) a token holding timer that provides a count value represented by a first binary data character that consists of a first plurality of binary data bits;
   (b) means for generating an asynchronous threshold value represented by a second binary data character that consists of a second plurality of binary data bits that differs in number from the first plurality of binary data bits;
   (c) conversion means for converting the asynchronous threshold value to a conversion value represented by a third binary data character that consists of a number of binary data bits that equals the first plurality of binary data bits;
   (d) comparison means for comparing the first binary data character and the third binary data character to determine whether the conversion value is greater than the count value;
   (e) allocation means for allcoating the token to the station for asynchronous communication for the specified time period if the conversion value is greater than the count value.

2. In a station which is one of a plurality of stations interconnected by a communications medium in a token ring communications system configuration wherein the station gains the right to transmit on the communications medium by capturing a token, asynchronous priority select logic for allocating the token to the station for asynchronous transmission for a specified time period, the asynchronous priority select logic comprising:
   (a) a token holding time that provides a count value represented by a first binary data character that consists of a first plurality of binary data bits;
   (b) storage means for storing a plurality of asynchronous threshold values, each asynchronous threshold value represented by a corresponding binary data character that consists of a second plurality of binary data bits;
   (c) selection means for selecting one of the asynchronous threshold values as a selected asynchronous threshold value;
   (d) conversion means for converting the selected asynchronous threshold value to a conversion value represented by a third binary data character that consists of a number of binary data bits that equals the first plurality of binary data bits;
   (e) comparison means for comparing the the first binary data character and the third binary data character to determine whether the conversion value is greater than the count value; and
   (f) allocation means for allocating the token to the station for asynchronous communication for the specified time period if the conversion value is greater than the count value.

3. Asynchronous priority select logic as in claim 2 wherein the first plurality is greater than the second plurality.

4. In a station which is one of a plurality of stations interconnected by a communications medium in a token ring configuration wherein the station gains the right to transmit on the communications medium by capturing a token, asynchronous priority select for allocating the token to the station for asynchronous transmission for a specified time period, the asynchronous priority select logic comprising:
   (a) a token holding up-counter that provides a 24-bit count value;
   (b) storage means for storing a plurality of 4-bit asynchronous threshold values;
   (c) selection means for selecting one of the asynchronous threshold values as a selected asynchronous threshold value (AT);
   (d) expander means for expanding the selected asynchronous threshold value (AT) to a 24-bit conversion value (CV) utilizing the equation $$CV = -[2^7 + AT];$$

(e) comparison means for comparing the 24-bit conversion value and the 24-bit count value to determine whether the conversion value is greater than the count value; and
   (f) allocation means for allocating the token to the station for the specified time period if the conversion value is greater than the count value.

5. A method of allocating a token to a station for asynchronous transmission on a communications medium for a specified time period, the station being one of a plurality of stations interconnected by the communications medium in a token ring communications system wherein the station gains the right to transmit on the communications medium by capturing the token, the method comprising:
   (a) providing a count value represented by first binary data character that consists of a first plurality of binary data bits;
   (b) generating an asynchronous threshold value represented by a second binary data character that consists of a second plurality of binary data bits that differs in number from the first plurality of data bits;
   (c) converting the asynchronous threshold value to a conversion value represented by a third binary data character that consists of the first plurality of binary data bits;

(d) comparing the first binary data character and the third binary data character to determine whether the conversion value is greater than the count value; and (e) allocating the token to the station for asynchronous transmission for the specified time period if the conversion value is greater than the count value.

6. A method of allocating a token to a station for asynchronous transmission of a communications medium for a specified time period, the station being one of a plurality of stations interconnected by the communications medium in a token ring communication system wherein the station gains the right to transmit on the communications medium by capturing the token, the method comprising:

(a) providing a count value represented by a first binary data character that consists of a first plurality of binary data bits;

(b) storing a plurality of asynchronous threshold values, each asynchronous threshold value of a second plurality of binary data bits different in number from the first plurality of data bits;

(c) selecting one of the asynchronous threshold values as a selected asynchronous threshold value;

(d) converting the selected asynchronous threshold value to a conversion value represented by a third binary data character that consists of a number of data bits equal to the first plurality of binary data bits;

(e) comparing the first binary data character and the third binary data character to determine whether the conversion value is greater than the count value; and (f) allocating the token to the station for asynchronous transmission for the specified time period if the conversion value is greater than the count value.

7. A method as in claim 6 wherein the first plurality is greater than the second plurality.

8. A method of allocating a token to a station for asynchronous transmission on a communications medium for a specified time period, the station being one of a plurality of stations interconnected by the communications medium in the token ring communication system wherein the station gains the right to transmit in the communications medium by capturing the token, the method comprising:

(a) providing a 24-bit count value;

(b) storing a plurality of 4-bit asynchronous threshold values;

(c) selecting one of the asynchronous threshold values as a selected asynchronous threshold value (AT);

(d) expanding the selected asynchronous threshold value (AT) from a 4-bit value to a 24-bit conversion value (CV) utilizing the equation $$CV = -[2^{(7+AT)}];$$

(e) comparing the 24-bit conversion value and the 24-bit count value to determine whether conversion is greater than the count value; and (f) allocating the token to the station for asynchronous communication for the specified time period if the conversion value is greater than the count value.

* * * * *

UNITED STATES PATENT AND TRADEMARK OFFICE
CERTIFICATE OF CORRECTION

PATENT NO. : 5,051,986
DATED : September 24, 1991
INVENTOR(S) : Robert M. Grow, Perry S. Stultz It is certified that error appears in the above-identified patent and that said Letters Patent is hereby corrected as shown below:

In Col. 10, correct claim 4(d) equation to read as follows:

--$CV = -[2^{(7+AT)}];$--

Signed and Sealed this

Ninth Day of March, 1993

*Attest:*

STEPHEN G. KUNIN

*Attesting Officer*    Acting Commissioner of Patents and Trademarks